(12) United States Patent
Nakahata et al.

(10) Patent No.: US 9,066,094 B2
(45) Date of Patent: Jun. 23, 2015

(54) DISPLAY DEVICE AND DISPLAY METHOD

(75) Inventors: Yuji Nakahata, Kanagawa (JP); Makoto Nakagawa, Tokyo (JP)

(73) Assignee: Sony Corporation (JP)

( * ) Notice: Subject to any disclaimer, the term of this patent is extended or adjusted under 35 U.S.C. 154(b) by 703 days.

(21) Appl. No.: 12/661,737

(22) Filed: Mar. 23, 2010

(65) Prior Publication Data

US 2010/0245400 A1 Sep. 30, 2010

(30) Foreign Application Priority Data

Mar. 31, 2009 (JP) .............................. P2009-086376

(51) Int. Cl.
*G09G 5/00* (2006.01)
*G09G 5/10* (2006.01)
*H04N 13/04* (2006.01)
(Continued)

(52) U.S. Cl.
CPC .......... *H04N 13/0497* (2013.01); *G09G 3/003* (2013.01); *G09G 3/3611* (2013.01); *G09G 2320/0285* (2013.01); *G09G 2340/16* (2013.01); *H04N 13/0438* (2013.01)

(58) Field of Classification Search
CPC ............... G09G 3/003; G09G 3/3406; G09G 2320/0233; G09G 2340/16
USPC .............. 345/418, 690–699, 4–9, 204–215; 349/13–15, 11; 359/13, 462–477, 359/618–640, 614; 348/61, 42–60, 115
See application file for complete search history.

(56) References Cited

U.S. PATENT DOCUMENTS

| | | | | |
|---|---|---|---|---|
| 5,945,965 A | * | 8/1999 | Inoguchi et al. | 345/6 |
| 6,532,008 B1 | * | 3/2003 | Guralnick | 345/419 |
| 6,765,568 B2 | * | 7/2004 | Swift et al. | 345/419 |

(Continued)

FOREIGN PATENT DOCUMENTS

| EP | 1879173 A1 | 1/2008 |
|---|---|---|
| JP | 09-138384 A | 5/1997 |

(Continued)

OTHER PUBLICATIONS

Office Action from Japanese Application No. 2009-086376, dated Nov. 20, 2012.

(Continued)

*Primary Examiner* — Amr Awad
*Assistant Examiner* — Roberto Flores
(74) *Attorney, Agent, or Firm* — Lerner, David, Littenberg, Krumholz & Mentlik, LLP

(57) ABSTRACT

There is provided a display device that includes a display portion and a drive compensation portion. The display portion line-sequentially displays, in an image display region, a first image based on a first image signal and a second image based on a second image signal, by sequentially switching the first image and the second image at a predetermined interval. The drive compensation portion performs predetermined drive compensation on the first image signal and the second image signal input to the display portion, in accordance with a position of the image display region, a luminance of the first image and a luminance of the second image. The predetermined drive compensation is performed such that an average luminance of the first image or the second image becomes substantially uniform in the image display region during a predetermined period that is shorter than the predetermined interval.

12 Claims, 16 Drawing Sheets

(51) Int. Cl.
*G09G 3/00* (2006.01)
*G09G 3/36* (2006.01)

(56) References Cited

U.S. PATENT DOCUMENTS

| | | | |
|---|---|---|---|
| 7,489,311 B2* | 2/2009 | Lee | 345/204 |
| 7,724,211 B2* | 5/2010 | Slavenburg et al. | 345/8 |
| 7,898,603 B2* | 3/2011 | Sharp | 349/13 |
| 8,085,217 B2* | 12/2011 | Slavenburg et al. | 345/8 |
| 2006/0181503 A1 | 8/2006 | Feng | |
| 2006/0268104 A1* | 11/2006 | Cowan et al. | 348/42 |
| 2007/0229395 A1* | 10/2007 | Slavenburg et al. | 345/8 |
| 2008/0036696 A1 | 2/2008 | Slavenburg et al. | |
| 2008/0303963 A1* | 12/2008 | Jung et al. | 349/13 |
| 2008/0316303 A1* | 12/2008 | Chiu et al. | 348/51 |
| 2009/0040402 A1* | 2/2009 | Tomita et al. | 349/15 |
| 2010/0060723 A1* | 3/2010 | Kimura et al. | 348/56 |
| 2011/0012904 A1* | 1/2011 | Slavenburg et al. | 345/501 |
| 2011/0216252 A1* | 9/2011 | MacNaughton et al. | 349/15 |

FOREIGN PATENT DOCUMENTS

| | | |
|---|---|---|
| JP | 2000-036969 A | 2/2000 |
| JP | 2003-045343 A | 2/2003 |
| JP | 2006157775 A | 6/2006 |
| JP | 2006330171 A | 12/2006 |
| JP | 2008158472 A | 7/2008 |
| JP | 2009-025436 A | 2/2009 |
| JP | 2009292993 A | 12/2009 |
| JP | 2010156972 | 7/2010 |
| WO | WO 2008056753 A1 * | 5/2008 |

OTHER PUBLICATIONS

European Search Report from EP Application No. 10157512, dated Jul. 22, 2013.

* cited by examiner

FIG. 1
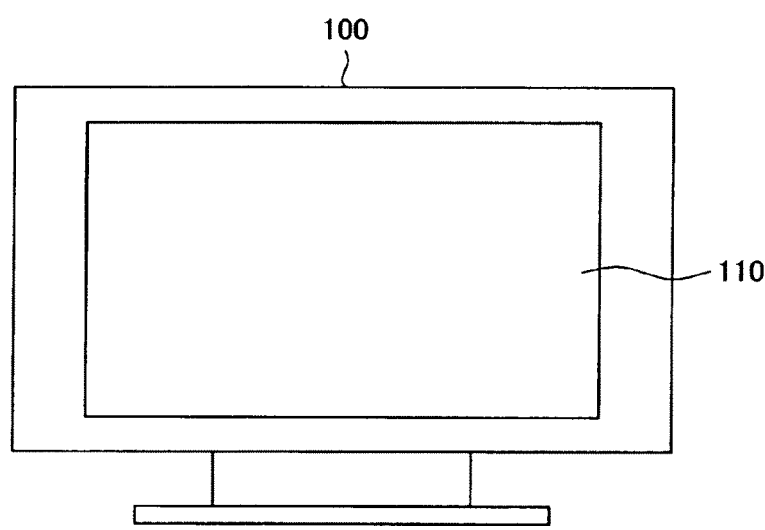
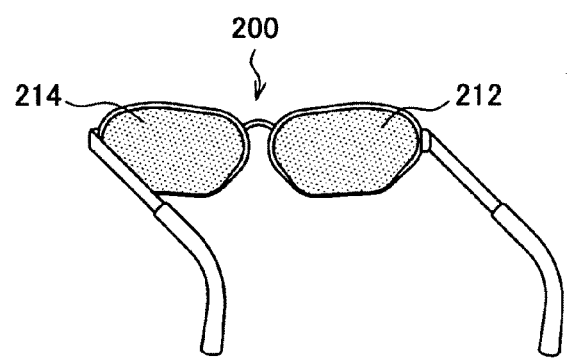

DISPLAY DEVICE AND DISPLAY METHOD

CROSS-REFERENCE TO RELATED APPLICATION

The present application claims priority from Japanese Patent Application No. JP 2009-086376 filed in the Japanese Patent Office on Mar. 31, 2009, the entire content of which is incorporated herein by reference.

BACKGROUND OF THE INVENTION

1. Field of the Invention

The present invention relates to a display device and a display method.

2. Description of the Related Art

Display devices exist in which an image displayed on a screen is perceived by a viewer as a stereoscopic image. A time sharing display system is known as a technique to cause the viewer to perceive an image displayed on this type of display device as a stereoscopic image. The time sharing display system alternately displays an image for the left eye and an image for the right eye on the entire screen at very short intervals (refer to Japanese Patent Application Publication No. JP-A-9-138384, Japanese Patent Application Publication No. JP-A-2000-36969 and Japanese Patent Application Publication No. JP-A-2003-45343).

An image displayed by the time sharing display system can be perceived by the viewer as a stereoscopic image through shutter glasses worn by the viewer. During an interval in which an image for the left eye is displayed, a left eye shutter (a liquid crystal shutter, for example) of the shutter glasses is opened to allow the light from the screen to pass through, and a right eye shutter of the shutter glasses is closed to shut off the light from the screen. On the other hand, during an interval in which an image for the right eye is displayed, the left eye shutter of the shutter glasses is closed to shut off the light from the screen, and the right eye shutter of the shutter glasses is opened to allow the light from the screen to pass through.

However, with this type of display device, crosstalk may occur due to characteristics of the display device and the shutter glasses, such as an insufficient liquid crystal response speed (when a liquid crystal panel is used as a screen) and insufficient contrast of the liquid crystal shutters of the shutter glasses. Crosstalk is a phenomenon in which a part of the image for the right eye enters into the left eye and a part of the image for the left eye enters into the right eye.

As a method to improve crosstalk, a method has been proposed in which the display panel is driven at a high speed (for example, 240 Hz), and an image for the left eye and an image for the right eye are each displayed on the screen two times repeatedly. The shutter glasses are opened only in a period during which each of the images is displayed for the second time.

SUMMARY OF THE INVENTION

With the above-described method, image writing is performed in a line sequential manner, from the upper edge to the lower edge of the screen. However, because the shutters of the shutter glasses are opened together at a predetermined timing, the screen has a position in which crosstalk worsens.

In light of the foregoing, it is desirable to provide a novel and improved display device and display method that are capable of improving crosstalk in all regions of a screen in a period during which light is allowed to enter the eyes of a viewer, by compensating drive of image signals that cause the viewer to perceive a stereoscopic image.

According to an embodiment of the present invention, there is provided a display device including a display portion that line-sequentially displays, in an image display region, a first image based on a first image signal and a second image based on a second image signal, by sequentially switching the first image and the second image at a predetermined interval and a drive compensation portion that performs predetermined drive compensation on the first image signal and the second image signal input to the display portion, in accordance with a position of the image display region, a luminance of the first image and a luminance of the second image, such that an average luminance of one of the first image and the second image becomes substantially uniform in the image display region during a predetermined period that is shorter than the predetermined interval.

With the structure described above, the display portion line-sequentially displays, in the image display region, the first image based on the first image signal and the second image based on the second image signal, by sequentially switching the first image and the second image at the predetermined interval. The drive compensation portion performs the predetermined drive compensation on the first image signal and the second image signal input to the display portion, in accordance with the position of the image display region, the luminance of the first image and the luminance of the second image, such that the average luminance of the first image or the second image becomes substantially uniform in the image display region during a predetermined period that is shorter than the predetermined interval. As a result, by compensating drive of the image signals that cause the viewer to perceive a stereoscopic image, crosstalk can be improved in all regions of the screen that displays images.

The drive compensation portion may include a drive compensation parameter storage portion that stores parameters used in the predetermined drive compensation, and a drive compensation execution portion that performs drive compensation on the first image signal and the second image signal, in accordance with the parameters stored in the drive compensation parameter storage portion.

When the luminance of the first image and the luminance of the second image in the predetermined period are extremely high or low, the drive compensation portion may perform the predetermined drive compensation in a period other than the predetermined period.

The parameters stored in the drive compensation parameter storage portion may have values that are different from each other with respect to a writing direction of the first image signal and the second image signal to the image display region.

The drive compensation parameter storage portion may have parameters that are different from each other in accordance with a plurality of regions in the image display region.

The drive compensation execution portion may perform drive compensation using parameters that continuously vary in accordance with the position of the image display region.

The drive compensation execution portion may generate the parameters that continuously vary in accordance with the position of the image display region, by interpolating parameters that are given in accordance with the position of the image display region.

The display portion may be a liquid crystal panel.

The predetermined period may be a period during which light from the display portion is allowed to enter the eyes of a viewer.

According to another embodiment of the present invention, there is provided a display method, including the steps of acquiring a first image signal and a second image signal that are input to a display portion that displays a first image based on the first image signal and a second image based on the second image signal on an image display region by sequentially switching the first image and the second image at a predetermined interval, acquiring a position of the image display region, a luminance of the first image and a luminance of the second image, performing predetermined drive compensation on the first image signal and the second image signal acquired in the signal acquiring step, in accordance with the position and the luminances acquired in the acquiring step, such that an average luminance of one of the first image and the second image becomes substantially uniform in the image display region during a predetermined period that is shorter than the predetermined interval, and displaying, in the image display region, the first image based on the first image signal and the second image based on the second image signal by sequentially switching the first image and the second image at the predetermined interval, the first image signal and the second image signal having been subjected to the drive compensation in the drive compensating step.

According to the present invention described above, it is possible to provide a novel and improved display device and display method that are capable of improving crosstalk in a period during which light is allowed to enter the eyes of the viewer, by compensating the drive of image signals that cause the viewer to perceive a stereoscopic image.

BRIEF DESCRIPTION OF THE DRAWINGS

FIG. 1 is an explanatory diagram showing the outer appearance of a display device 100 according to an embodiment of the present invention;

DETAILED DESCRIPTION OF THE EMBODIMENT(S)

Figure 2:
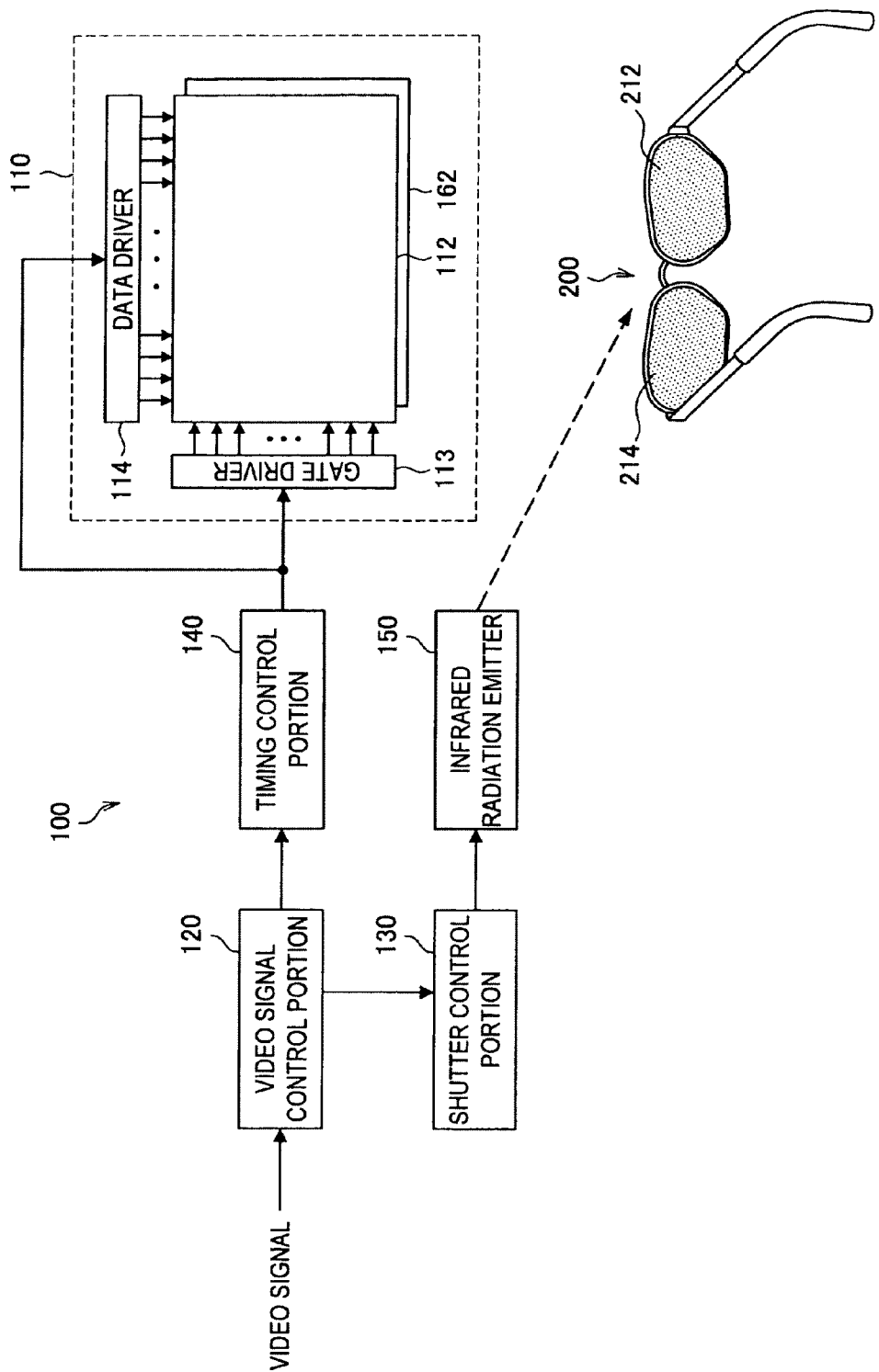
FIG. 2 is an explanatory diagram showing the functional structure of the display device 100 according to the embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

An exemplary embodiment of the present invention will be described in detail in the following order.

1. Embodiment of present invention
1-1. Structure of display device according to embodiment of present invention
1-2. Functional structure of display device according to embodiment of present invention
1-3. Structure of timing control portion
1-4. Known technique and problems thereof
1-5. Drive compensation method
1-6. Modified examples of drive compensation method
2. Conclusion
1. Embodiment of Present Invention
1-1. Structure of Display Device According to Embodiment of Present Invention Hereinafter, the structure of a display device 100 according to an embodiment of the present invention will be explained. First, the outer appearance of the display device 100 according to the embodiment of the present invention will be described. FIG. 1 is an explanatory diagram showing the outer appearance of the display device 100 according to the embodiment of the present invention. Additionally, FIG. 1 also shows shutter glasses 200, which are used to cause a viewer to perceive an image displayed on the display device 100 as a stereoscopic image.

The display device 100 shown in FIG. 1 is provided with an image display portion 110 that displays images. The display device 100 does not only display normal images on the image display portion 110, but can also display three-dimensional images on the image display portion 110 that are perceived by the viewer as stereoscopic images.

The structure of the image display portion 110 will be described in more detail later. As a simple description here, the image display portion 110 includes a light source, a liquid crystal panel and a pair of polarizing plates that sandwich the liquid crystal panel. Light from the light source is polarized in a predetermined direction by passing through the liquid crystal panel and the polarizing plates.

The shutter glasses 200 include a right eye image transmission portion 212 and a left eye image transmission portion 214, which are liquid crystal shutters, for example. The shutter glasses 200 perform opening and closing operations of the right eye image transmission portion 212 and the left eye image transmission portion 214, in response to a signal transmitted from the display device 100. The viewer can perceive an image displayed on the image display portion 110 as a stereoscopic image, by looking at the light emitted from the image display portion 110 through the right eye image transmission portion 212 and the left eye image transmission portion 214 of the shutter glasses 200.

On the other hand, when a normal image is displayed on the image display portion 110, by seeing the light output from the image display portion 110 as it is, the viewer can perceive the image as the normal image.

Note that, in FIG. 1, the display device 100 is portrayed as a television receiver, but the present invention is naturally not limited to this example of the form of the display device 100. The display device 100 according to the present invention may be, for example, a monitor that is used when connected to an electronic appliance such as a personal computer or the like, or it may be a mobile game console, a mobile telephone, or a portable music playback device and so on.

The outer appearance of the display device 100 according to the embodiment of the present invention is described above. Next, the functional structure of the display device 100 according to the embodiment of the present invention will be explained.

1-2. Functional Structure of Display Device According to Embodiment of Present Invention FIG. 2 is an explanatory diagram showing the functional structure of the display device 100 according to the embodiment of the present invention. Hereinafter, the functional structure of the display device 100 according to the embodiment of the present invention will be explained with reference to FIG. 2.

As shown in FIG. 2, the display device 100 according to the embodiment of the present invention includes the image display portion 110, a video signal control portion 120, a shutter control portion 130, a timing control portion 140 and an infrared radiation emitter 150.

The image display portion 110 displays images in the manner described above, and when a signal is applied from an external source, display of images is performed in accordance with the applied signal. The image display portion 110 includes a display panel 112, a gate driver 113, a data driver 114 and a backlight 115.

The display panel 112 displays images in accordance with the signal applied from an external source. The display panel 112 displays images by sequentially scanning a plurality of scanning lines. Liquid crystal molecules having a predetermined orientation are filled in a space between transparent plates, made of glass or the like, of the display panel 112. A drive system of the display panel 112 may be a twisted nematic (TN) system, a vertical alignment (VA) system, or an in-place-switching (IPS) system. In the following explanation, the drive system of the display panel 112 is the TN system, unless otherwise specified, but it goes without saying that the present invention is not limited to this example. Note that the display panel 112 according to the present embodiment is a display panel that can rewrite the screen at a high-speed frame rate (240 Hz, for example). In the present embodiment, an image for the right eye and an image for the left eye are displayed alternately on the display panel 112 at a predetermined timing, thereby causing the viewer to perceive a stereoscopic image.

The gate driver 113 is a driver that drives a gate bus line (not shown in the figures) of the display panel 112. A signal is transmitted from the timing control portion 140 to the gate driver 113, and the gate driver 113 outputs a signal to the gate bus line in accordance with the signal transmitted from the timing control portion 140.

The data driver 114 is a driver that generates a signal that is applied to a data line (not shown in the figures) of the display panel 112. A signal is transmitted from the timing control portion 140 to the data driver 114. The data driver 114 generates a signal to be applied to the data line, in accordance with the signal transmitted from the timing control portion 140, and outputs the generated signal.

The backlight 115 is provided on the furthermost side of the image display portion 110 as seen from the side of the viewer. When an image is displayed on the image display portion 110, white light that is not polarized (unpolarized light) is output from the backlight 115 to the display panel 112 positioned on the side of the viewer. The backlight 115 may use a light-emitting diode, for example, or may use a cold cathode tube. Note that the backlight 115 shown in FIG. 2 is a surface light source, but the present invention is not limited to this form of light source. For example, the light source may be arranged around the peripheral edges of the display panel 112, and may output light to the display panel 112 by diffusing the light from the light source using a diffuser panel etc. Alternatively, for example, a point light source and a condenser lens may be used in combination in place of the surface light source.

When the video signal control portion 120 receives a video signal from an external source, the video signal control portion 120 performs various types of signal processing on the received video signal such that it is suitable for three-dimensional image display on the image display portion 110 and outputs the processed signal. The video signal on which signal processing has been performed by the video signal control portion 120 is transmitted to the timing control portion 140. Further, when the video signal control portion 120 performs signal processing, it transmits a predetermined signal to the shutter control portion 130 in accordance with the signal processing. The signal processing by the video signal control portion 120 is, for example, as described below.

When a video signal to display the image for the right eye on the image display portion 110 (a right eye video signal) and a video signal to display the image for the left eye on the image display portion 110 (a left eye video signal) are received by the video signal control portion 120, the video signal control portion 120 generates, from the two received video signals, a video signal for a three-dimensional image. In the present embodiment, the video signal control portion 120 generates, from the received right eye video signal and the left eye video signal, video signals to display images on the display panel 112 in the following order: image for the right eye→image for the right eye→image for the left eye→image for the left eye→image for the right eye→image for the right eye→and so on.

The shutter control portion 130 receives the predetermined signal that is generated in accordance with the signal processing by the video signal control portion 120, and generates a shutter control signal that controls shutter operation of the shutter glasses 200 in accordance with the predetermined signal. The shutter glasses 200 perform opening and closing operations of the right eye image transmission portion 212 and the left eye image transmission portion 214, based on the shutter control signal that is generated by the shutter control portion 130 and output from the infrared radiation emitter 150.

In accordance with the signal transmitted from the video signal control portion 120, the timing control portion 140 generates a pulse signal that is used to operate the gate driver 113 and the data driver 114. When the pulse signal is generated by the timing control portion 140, and the gate driver 113 and the data driver 114 receive the pulse signal generated by the timing control portion 140, an image corresponding to the signal transmitted from the video signal control portion 120 is displayed on the display panel 112.

Further, the timing control portion 140 performs predetermined signal processing when it generates the pulse signal used to operate the gate driver 113 and the data driver 114. The timing control portion 140 is an example of a drive compensation portion of the present invention. The predetermined signal processing in the timing control portion 140 makes it possible to improve crosstalk in a period during which the shutters of the shutter glasses 200 are opened. The predetermined signal processing in the timing control portion 140 will be described in detail later.

The functional structure of the display device 100 according to the embodiment of the present invention is explained above. Next, the structure of the timing control portion 140 according to the embodiment of the present invention will be explained.

1-3. Structure of Timing Control Portion

Figure 3:
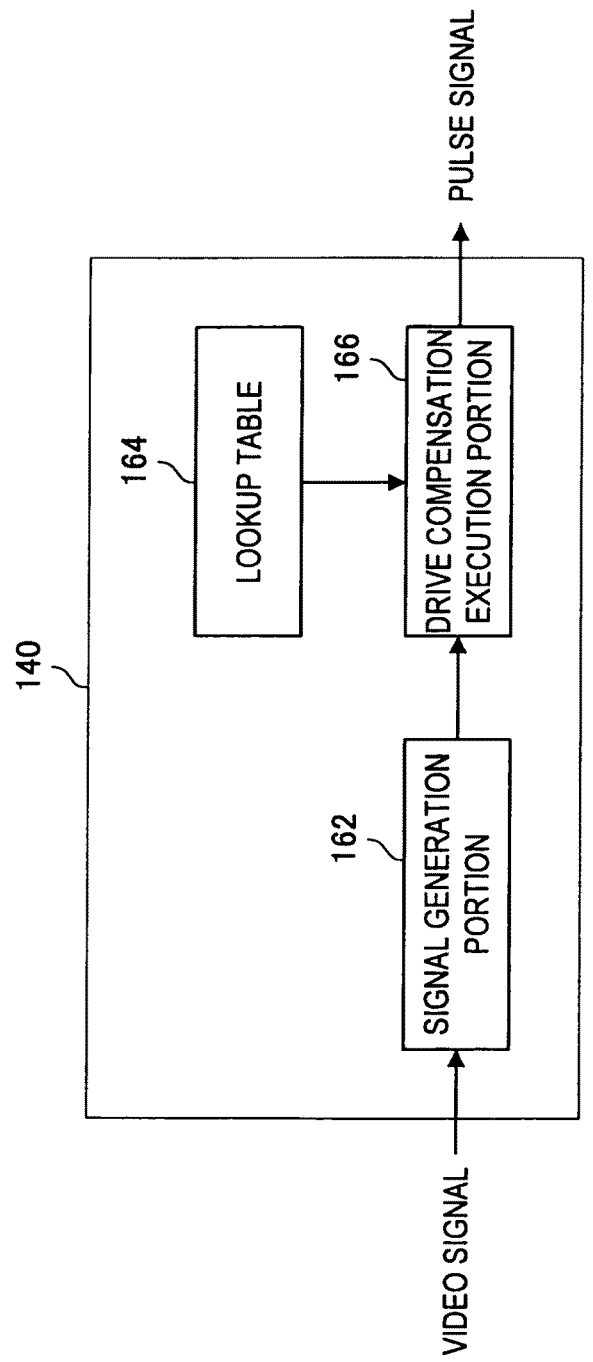
FIG. 3 is an explanatory diagram showing the structure of a timing control portion 140 according to the embodiment of the present invention.

FIG. 3 is an explanatory diagram showing the structure of the timing control portion 140 according to the embodiment of the present invention. Hereinafter, the structure of the timing control portion 140 according to the embodiment of the present invention will be explained with reference to FIG. 3.

As shown in FIG. 3, the timing control portion 140 according to the embodiment of the present invention includes a signal generation portion 162, a lookup table 164 and a drive compensation execution portion 166.

The signal generation portion 162 generates a pulse signal used to operate the gate driver 113 and the data driver 114, in accordance with a signal transmitted from the video signal control portion 120. The signal generation portion 162 generates the pulse signal, and the gate driver 113 and the data driver 114 operate based on the pulse signal. As a result, an image is displayed on the display panel 112. The pulse signal generated by the signal generation portion 162 is transmitted to the drive compensation execution portion 166.

The lookup table 164 is an example of a drive compensation parameter storage portion of the present invention, and is a table that stores parameters to be used for signal processing in the drive compensation execution portion 166. Note that, in the present embodiment, the drive compensation execution portion 166 performs overdrive processing as signal processing in the drive compensation execution portion 166.

Figure 4:
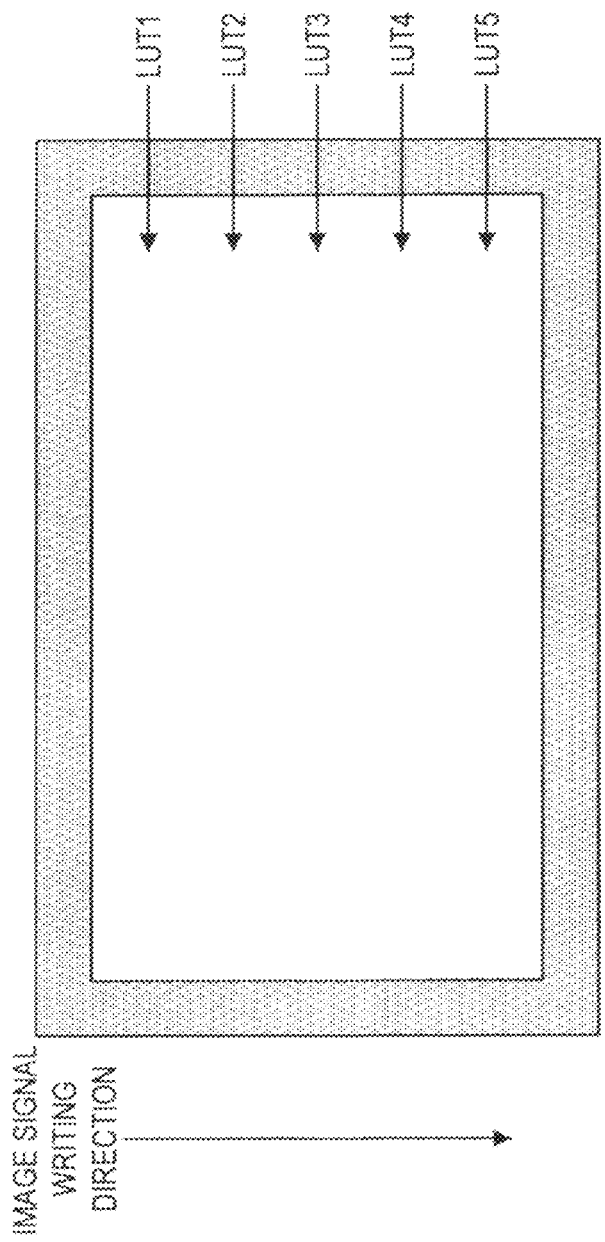
FIG. 4 is an explanatory diagram showing parameters stored in a lookup table 164.

The parameters stored in the lookup table 164 may be parameters that vary depending on regions of the display panel 112. For example, the lookup table 164 may store parameters that correspond to a plurality of positions in a scanning direction (a direction in which the image signal generated by the signal generation portion 162 is written) of the display panel 112. FIG. 4 is an explanatory diagram showing the parameters that are stored in the lookup table 164 and that correspond to the plurality of positions in the scanning direction of the display panel 112. FIG. 4 shows that different parameters LUT1 to LUT5, which are used for overdrive processing in the drive compensation execution portion 166, are stored in the lookup table 164, from the upper section to the lower section of the display panel 112. Note that the parameters LUT1 to LUT5 stored in the lookup table 164 may be parameters whose values vary continuously.

Note that, in the present invention, it goes without saying that the relationship between the parameters and their positions in the display panel 112 is not limited to this example.

For example, if the image signal generated by the signal generation portion 162 is written in a horizontal direction, a plurality of different parameters that correspond to the direction from the left to the right of the display panel 112 (or the direction opposite to that direction) may be stored in the lookup table 164. If a parameter is desired to be positioned in a certain region, the parameter of the certain region may be determined by interpolation processing with respect to that parameter, using parameters corresponding to the upper and lower regions of the certain region. The number of the parameters may be appropriately set in accordance with a write speed of the image signal to the display panel 112, and a response speed of the liquid crystal molecules with which the display panel 112 is filled.

The drive compensation execution portion 166 performs signal processing on the pulse signal generated by the signal generation portion 162. As described above, in the present embodiment, the drive compensation execution portion 166 performs overdrive processing, as signal processing in the drive compensation execution portion 166. The drive compensation execution portion 166 performs signal processing on the pulse signal used to operate the gate driver 113 and the data driver 144, thereby compensating pixel drive on the display panel 112.

The structure of the timing control portion 140 according to the embodiment of the present invention is explained above. Next, the operation of the display device 100 according to the embodiment of the present invention will be explained. Before explaining the operation of the display device 100 according to the embodiment of the present invention, a crosstalk improvement method used in a known display device that displays three dimensional images and problems thereof will be explained.

1-4. Known Technique and Problems Thereof

Figure 5:
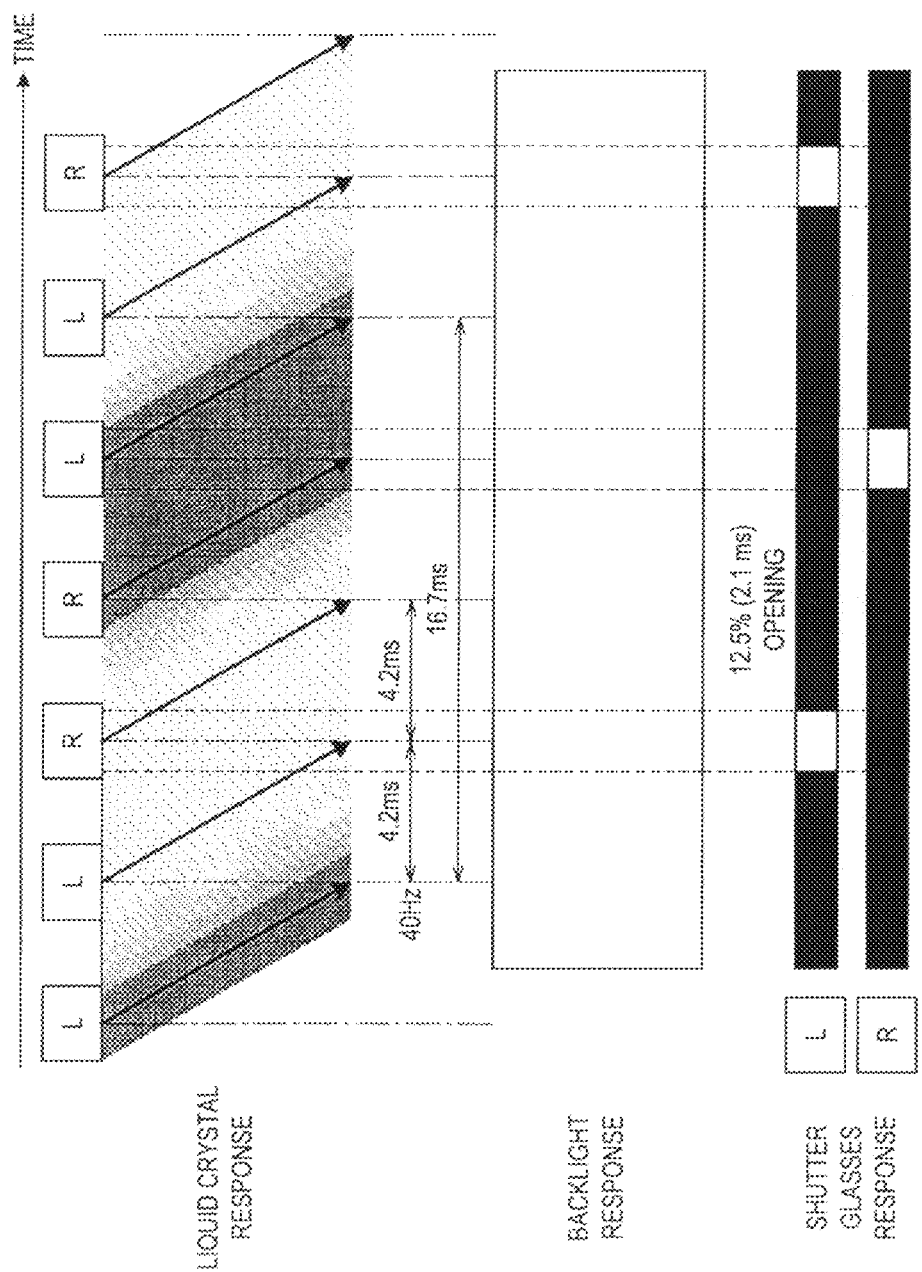
FIG. 5 is an explanatory diagram showing, in a time series, liquid crystal response of a display panel, backlight response and shutter glasses response.

FIG. 5 is an explanatory diagram showing, in a time series, liquid crystal response of a display panel, backlight response and shutter glasses response, in the known display device that displays three dimensional images. The display panel is sequentially scanned from the uppermost section. Therefore, a time difference in the liquid crystal response occurs between the uppermost section and the lowermost section of the display panel. When the display panel is driven at 240 Hz, a display time per frame is approximately 4.2 milliseconds. When an image for the right eye and an image for the left eye are each displayed two times continuously, the interval to display them is approximately 16.7 milliseconds. In this case, the backlight is kept on.

In the known display device, when the image for the right eye and the image for the left eye are each displayed on the display panel two times continuously, the shutter glasses are opened only for a part of the second display, thereby improving crosstalk. A shutter open period of the shutter glasses at this time is approximately 2.1 milliseconds, which corresponds to 12.5 percent of the interval when the image for the right eye and the image for the left eye are each displayed two times continuously, for example.

In this manner, the image for the right eye and the image for the left eye are each displayed two times continuously, and the shutter glasses are opened only for a part of the second display. This enables a three dimensional display in which the image for the right eye and the image for the left eye are not mixed together. Further, the same image is displayed two times continuously. Therefore, as compared to a case where the images are simply alternately displayed once each, it is possible to achieve a desired luminance on both the upper side and the lower side of the display panel.

Figure 6:
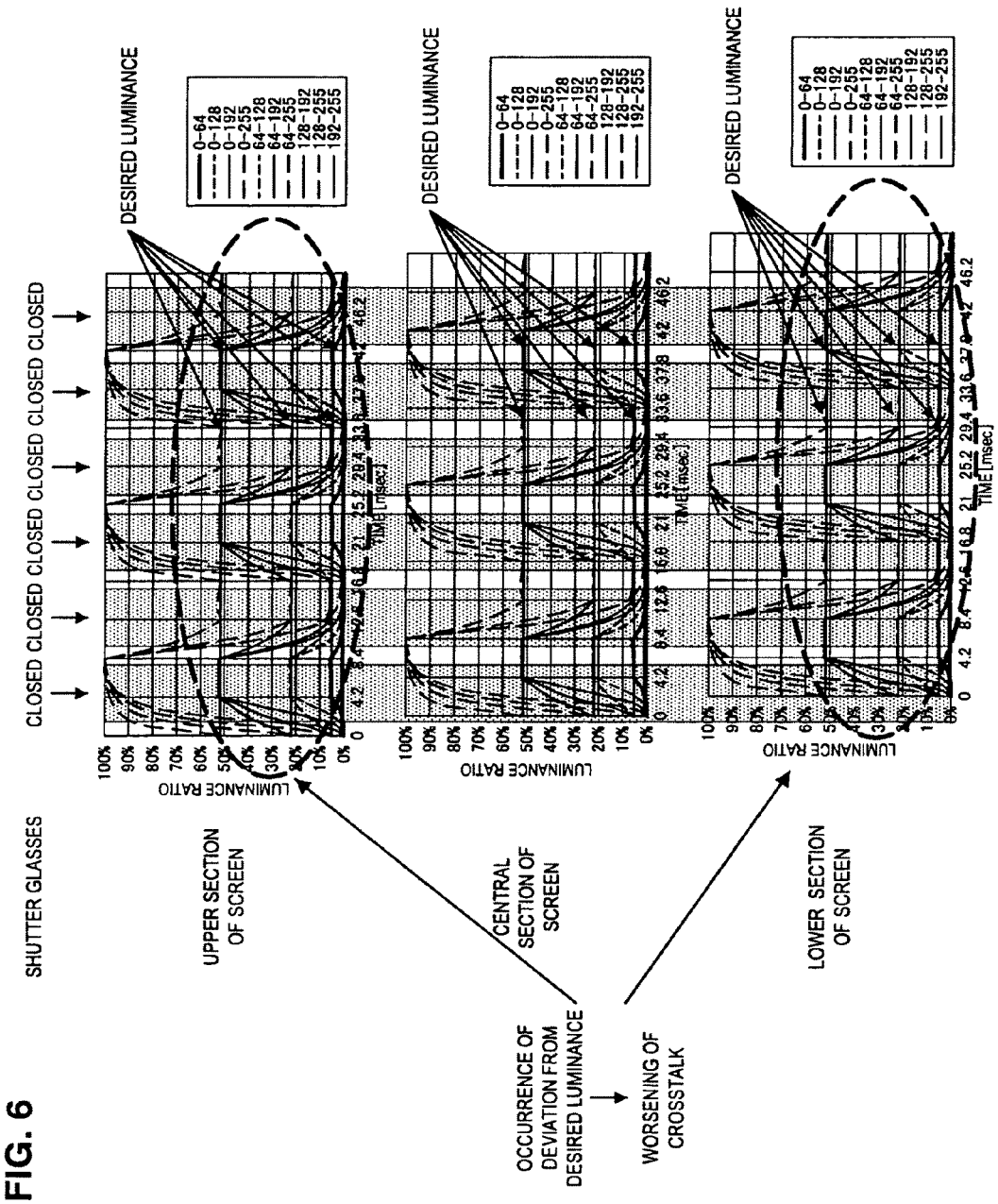
FIG. 6 is an explanatory diagram showing an example of luminance response waveforms in a known display device that displays three dimensional images.

However, the image displayed on the display panel is an image that is displayed as a result of performing sequential writing from the upper edge to the lower edge of the screen, by line-sequential writing to the display panel. On the other hand, the shutter glasses are opened together at a predetermined timing, and the light displayed by the display panel enters the eyes of the viewer who wears the shutter glasses. Accordingly, a position in which crosstalk worsens exists on the screen. FIG. 6 is an explanatory diagram showing an example of luminance response waveforms in the known display device that displays three dimensional images. FIG. 6 shows luminance response waveforms in the upper section of the screen, the central section of the screen and the lower section of the screen, using the same time axis.

As shown in FIG. 6, if the image for the right eye and the image for the left eye are each displayed two times continuously by the known display device, and if the shutter glasses are opened only for a part of the second display, image display with a desired luminance is performed for all the shutter open period in the central section of the screen when the image is seen through the shutter glasses. On the other hand, in the upper section and the lower section of the screen, image display is performed at a luminance that deviates from the desired luminance. Note that the term "desired luminance" represents a luminance at which, when an image displayed in all image display regions of the display panel is viewed through the shutter glasses, the image can be viewed without crosstalk.

Therefore, in the upper section and the lower section of the screen, when the image is seen through the shutter glasses, display with a desired luminance is not performed throughout all the shutter open period. As a result, a phenomenon occurs in which crosstalk worsens in these sections.

To address this, according to the embodiment of the present invention, when the display panel, the backlight and the shutter glasses are operated at the timings shown in FIG. 5, overdrive parameters that vary depending on the position on the screen are prepared, as will be described below. Then, the prepared overdrive parameters that vary depending on the position on the screen are used to compensate drive of the display panel so that a desired luminance is achieved in any section of the screen. If overdrive parameters that vary in this manner are prepared and the drive of the display panel is compensated, it is possible to reduce crosstalk.

1-5. Drive Compensation Method

Figure 7:
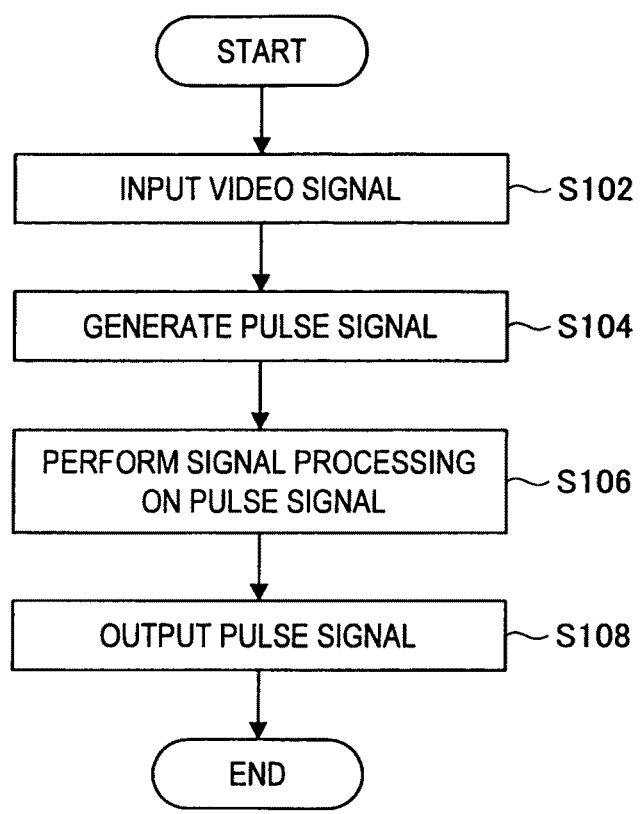
FIG. 7 is a flowchart illustrating a drive compensation method in the display device 100 according to the embodiment of the present invention.

Hereinafter, a drive compensation method in the display device 100 according to the embodiment of the present invention will be explained. FIG. 7 is a flowchart illustrating the drive compensation method in the display device 100 according to the embodiment of the present invention. Hereinafter, the drive compensation method in the display device 100 according to the embodiment of the present invention will be explained with reference to FIG. 7.

With the drive compensation method in the display device 100 according to the embodiment of the present invention, first, a video signal transmitted from the video signal control portion 120 is input to the timing control portion 140 (step S102). When the video signal is input to the timing control portion 140, the signal generation portion 162 generates, from the input video signal, a pulse signal used to operate the gate driver 113 and the data driver 114 (step S104). The generated pulse signal is transmitted to the drive compensation execution portion 166.

When the signal generation portion 162 generates the pulse signal used to operate the gate driver 113 and the data driver 114 and transmits the generated pulse signal to the drive compensation execution portion 166, the drive compensation execution portion 166 performs signal processing on the received pulse signal (step S106). The signal processing on the pulse signal performed by the drive compensation execution portion 166 is overdrive processing to obtain a desired luminance during an open period of the shutter glasses 200.

The drive compensation execution portion 166 performs the overdrive processing using the overdrive parameters stored in the lookup table 164. The overdrive parameters may be parameters that vary depending on the position on the display panel 112 as shown in FIG. 4.

When the drive compensation execution portion 166 performs signal processing on the pulse signal, the drive compensation execution portion 166 then outputs the processed pulse signal (step S108). The pulse signal output from the drive compensation execution portion 166 is input to the gate driver 113 and the data driver 114. The gate driver 113 and the data driver 114 supply a signal to the display panel 112 based on the pulse signal output from the drive compensation execution portion 166. The display panel 112 displays an image based on the signal on which signal processing has been performed by the drive compensation execution portion 166. When the viewer looks at the image display on the display panel 112 through the shutter glasses 200, the viewer can see the image displayed at a desired luminance, regardless of the position on the screen. Thus, it is possible to improve crosstalk.

As a result of performing the overdrive processing by the drive compensation execution portion 166, crosstalk is improved even in regions where crosstalk worsens in the known art, which will be explained below with reference to FIG. 8 to FIG. 16.

Figure 8:
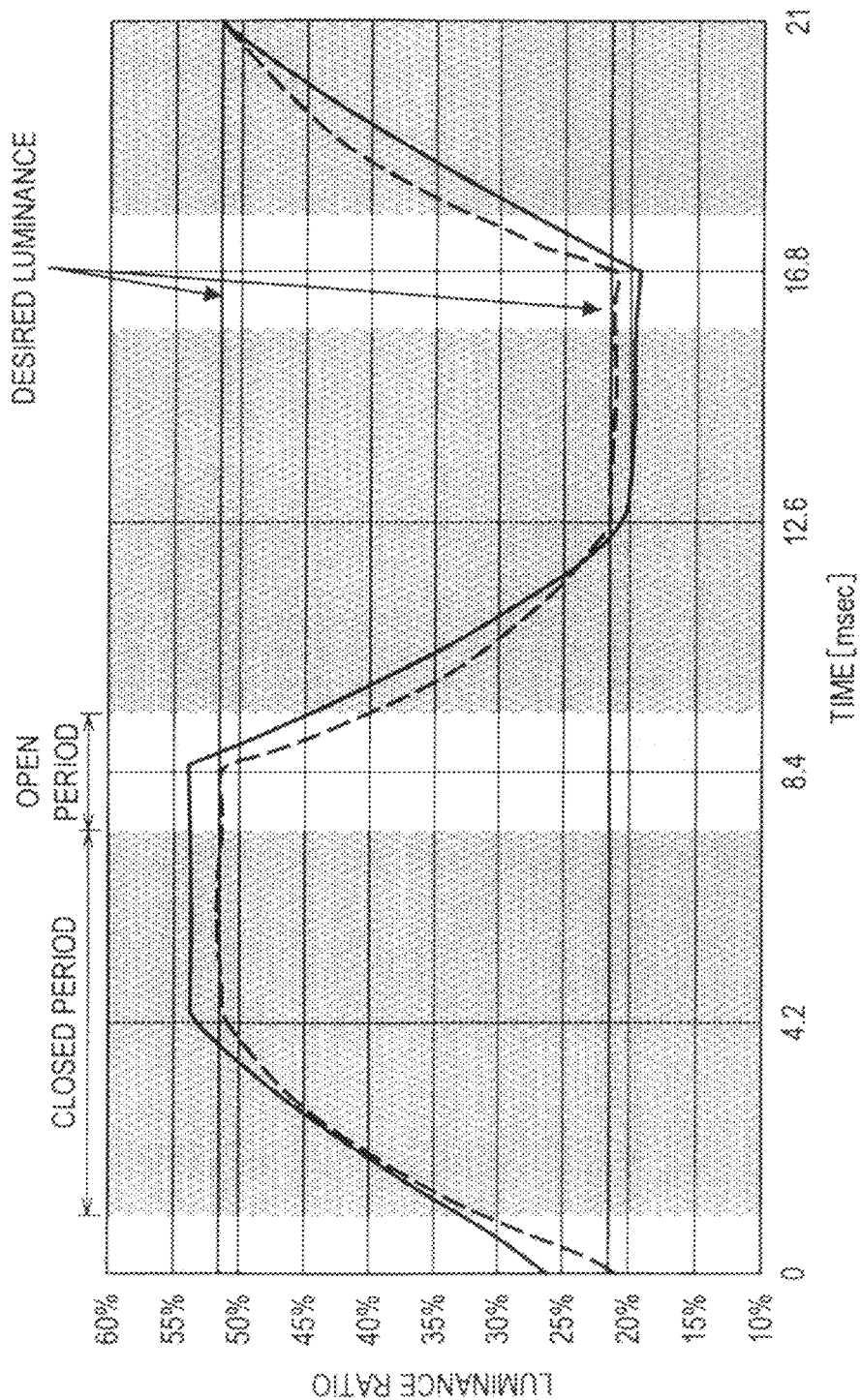
FIG. 8 is an explanatory diagram showing, in the form of a graph, an improvement example of intermediate gradation in an upper section of a screen.

FIG. 8 is an explanatory diagram showing, in the form of a graph, an improvement example of intermediate gradation in the upper section of the screen of the display panel 112, when the overdrive processing by the drive compensation execution portion 166 is performed. FIG. 8 shows luminance response when an image for the right eye and an image for the left eye are displayed on the display panel 112 two times continuously. In the example shown in FIG. 8, the first display (of the image for the left eye, for example) is performed on the display panel 112 in a period from 0 to 4.2 msec, and the second display is performed on the display panel 112 in a period from 4.2 to 8.4 msec. Further, the first display (of the image for the right eye, for example) is performed on the display panel 112 in a period from 8.4 to 12.6 msec, and the second display is performed on the display panel 112 in a period from 12.6 to 16.8 msec. In this manner, the display of the image for the right eye and the display of the image for the left eye are sequentially repeated.

In the upper section of the display panel 112, the shutters of the shutter glasses 200 are opened in the shutter open period. More specifically, in a period during which the second display of the image for the right eye (or the image for the left eye) is performed on the display panel 112, and in a period during which the first display of the image for the left eye (or the image for the right eye) is performed on the display panel 112, the left eye image transmission portion 214 (or the right eye image transmission portion 212) of the shutter glasses 200 is opened. In a time period other than the shutter open period is a time period during which the shutters of the shutter glasses 200 are closed (a shutter closed period).

In the graph shown in FIG. 8, the waveform shown by the dotted line indicates a change in luminance ratio when the known overdrive processing that optimizes the central section of the screen is performed. On the other hand, the waveform shown by the solid line indicates a change in luminance ratio when the overdrive processing by the drive compensation execution portion 166 is performed. Note that the vertical axis represents luminance ratios with respect to the most brightly displayed state, which is taken as 100 percent. Further, the shutter open period and the shutter closed period of the shutter glasses 200 are shown by changes in the background of the graph. Furthermore, in the graph shown in FIG. 8, the desired luminance during the shutter open period of the shutter glasses 200 is shown at two locations on a high luminance side and a low luminance side.

As shown by the dotted line waveform in FIG. 8, when the known overdrive processing that optimizes the central section of the screen is performed, the luminance starts to decrease or increase from the desired luminance when half of the shutter open period of the shutter glasses 200 has elapsed. Therefore, when the overdrive processing is not performed, display with a desired luminance is not performed for all the shutter open period of the shutter glasses 200.

On the other hand, as shown by the solid line waveform in FIG. 8, when the overdrive processing is performed by the drive compensation execution portion 166, an average luminance coincides with or approaches the desired luminance for all the shutter open period of the shutter glasses 200. In this manner, the overdrive processing is performed such that the average luminance coincides with or approaches the desired luminance. Therefore, it is possible to improve crosstalk.

When the overdrive processing is performed by the drive compensation execution portion 166, the luminance may be increased or decreased, not only during the shutter open period of the shutter glasses 200 as shown in FIG. 8, but also during the shutter closed period of the shutter glasses 200.

Figure 9:
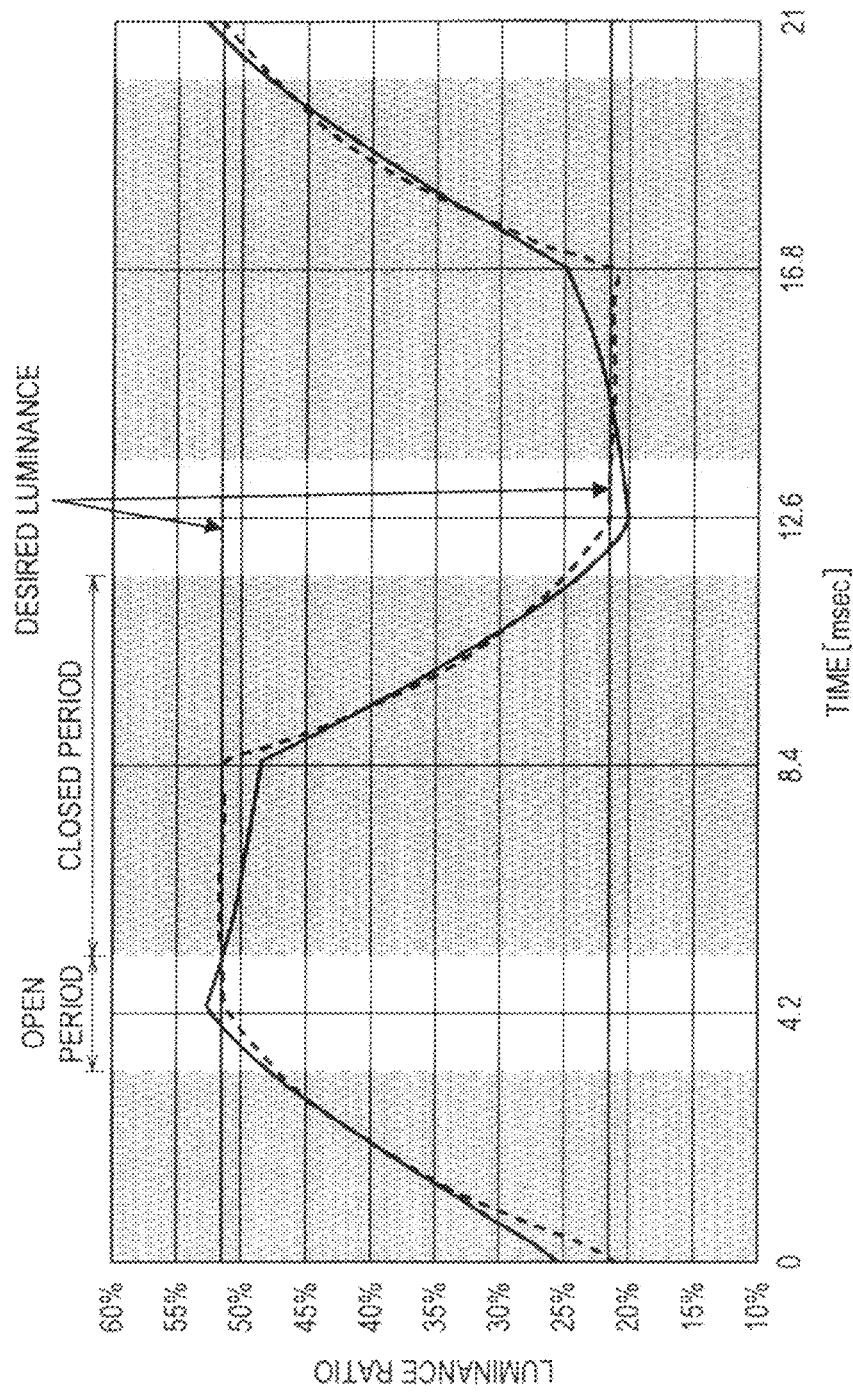
FIG. 9 is an explanatory diagram showing, in the form of a graph, an improvement example of intermediate gradation in a lower section of the screen.

FIG. 9 is an explanatory diagram showing, in the form of a graph, an improvement example of intermediate gradation in the lower section of the screen of the display panel 112, when the overdrive processing by the drive compensation execution portion 166 is performed. In FIG. 9, similar to FIG. 8, the waveform shown by the dotted line indicates a change in luminance ratio when the known overdrive processing that optimizes the central section of the screen is performed. On the other hand, the waveform shown by the solid line indicates a change in luminance ratio when the overdrive processing by the drive compensation execution portion 166 is performed. In the example shown in FIG. 9, the first display (of the image for the left eye, for example) is performed on the display panel 112 in a period from 0 to 4.2 msec, and the second display is performed on the display panel 112 in a period from 4.2 to 8.4 msec. Further, the first display (of the image for the right eye, for example) is performed on the display panel 112 in a period from 8.4 to 12.6 msec, and the second display is performed on the display panel 112 in a period from 12.6 to 16.8 msec. In this manner, the display of the image for the right eye and the display of the image for the left eye are sequentially repeated. Note that, although the shutter open periods are different in FIG. 8 and FIG. 9, this is for ease of explanation. The shutter open periods in the upper section and the lower section of the screen of the display panel 112 are the same.

As shown by the dotted line waveform in FIG. 9, when the known overdrive processing that optimizes the central section of the screen is performed, the desired luminance is at last reached when half of the shutter open period of the shutter glasses 200 has elapsed. Therefore, when the overdrive processing is not performed, display with a desired luminance is not performed for all the shutter open period of the shutter glasses 200.

On the other hand, as shown by the solid line waveform in FIG. 9, when the overdrive processing is performed by the drive compensation execution portion 166, an average luminance coincides with or approaches the desired luminance for all the shutter open period of the shutter glasses 200. In this manner, the overdrive processing is performed such that the average luminance coincides with or approaches the desired luminance. Therefore, it is possible to improve crosstalk.

When the overdrive processing is performed by the drive compensation execution portion 166, the luminance may be increased or decreased, not only during the shutter open period of the shutter glasses 200 as shown in FIG. 9, but also during the shutter closed period of the shutter glasses 200.

Figure 10:
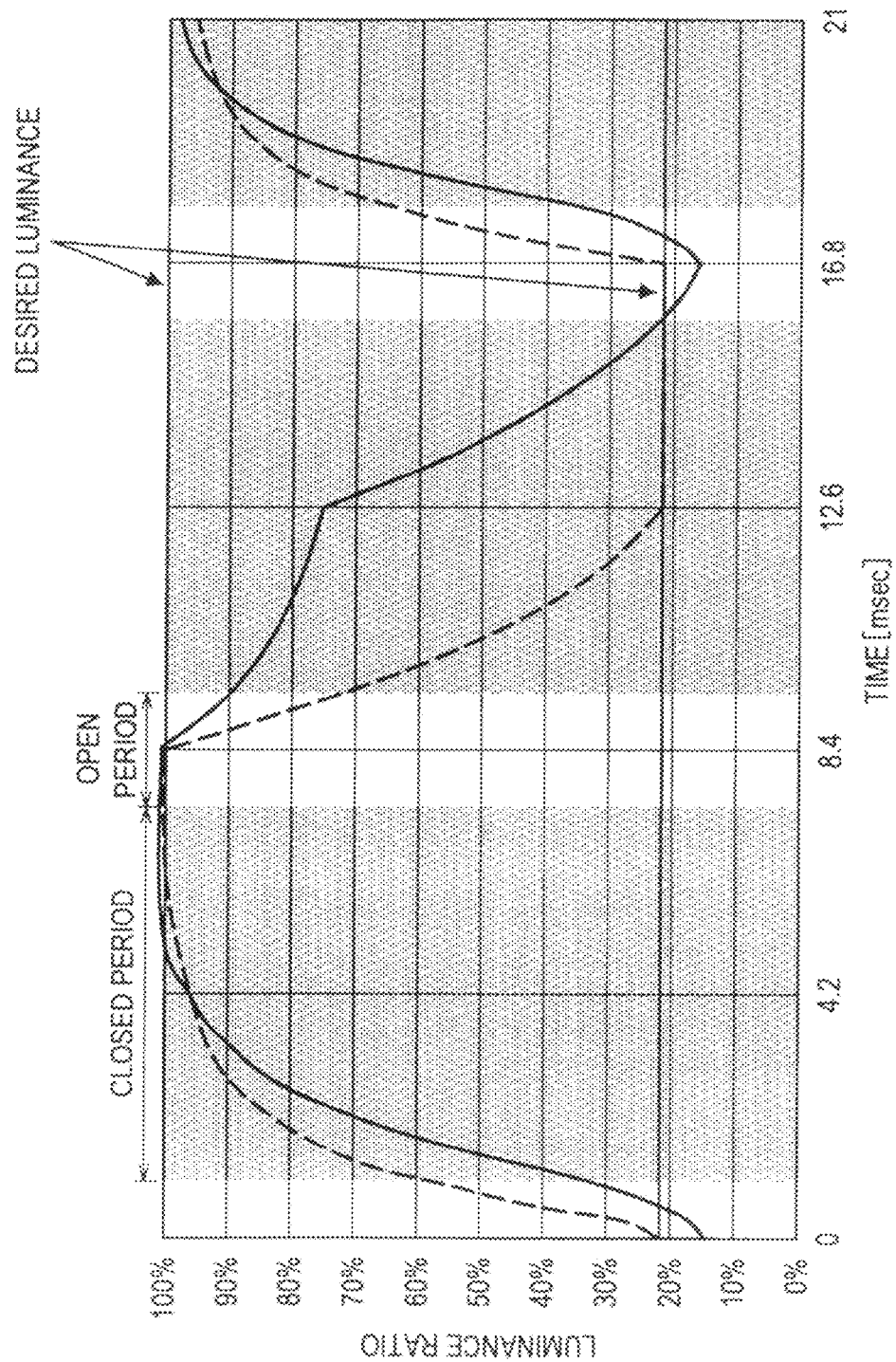
FIG. 10 is an explanatory diagram showing, in the form of a graph, an improvement example of high gradation in the upper section of the screen.

FIG. 10 is an explanatory diagram showing, in the form of a graph, an improvement example of high gradation in the upper section of the screen of the display panel 112, when the overdrive processing by the drive compensation execution portion 166 is performed. In FIG. 10, similar to FIG. 8 or the like, the waveform shown by the dotted line indicates a change in luminance ratio when the known overdrive processing that optimizes the central section of the screen is performed. On the other hand, the waveform shown by the solid line indicates a change in luminance ratio when the overdrive processing by the drive compensation execution portion 166 is performed. Further, in the example shown in FIG. 10, the shutter open period and the shutter closed period exist at the same timings as in the example shown in FIG. 8.

As shown by the dotted line waveform in FIG. 10, when the known overdrive processing that optimizes the central section of the screen is performed, the luminance starts to decrease or increase from the desired luminance when half of the shutter open period of the shutter glasses 200 has elapsed. Therefore, when the overdrive processing is not performed, display with a desired luminance is not performed for all the shutter open period of the shutter glasses 200.

The desired luminance can be approached by performing the overdrive processing by the drive compensation execution portion 166. However, when high gradation display is performed, it may not be possible to increase the luminance during the shutter open period of the shutter glasses 200. For example, as shown in FIG. 10, when the luminance ratio of the desired luminance is 100 percent, more improvement in luminance cannot be expected. Therefore, in the present embodiment, when high gradation display is performed, the luminance is improved during the shutter closed period of the shutter glasses 200. More specifically, overdrive processing that increases a voltage value of the next frame is performed. By performing the overdrive processing that improves the luminance during the shutter closed period of the shutter glasses 200, it is possible to suppress a decrease in luminance during the shutter open period of the shutter glasses 200. Further, with this overdrive processing, the average luminance can be caused to coincide with or approach the desired luminance for all the shutter open period of the shutter glasses 200.

However, when only the overdrive processing that improves the luminance only during the shutter closed period of the shutter glasses 200 is executed, display is performed at a luminance deviating from the desired luminance during the shutter open period of the shutter glasses 200 in which low luminance display is performed. Therefore, during the shutter open period in which low luminance display is performed, in order to perform display such that the average luminance coincides with or approaches the desired luminance, it is desirable that the execution time of the overdrive processing that improves the luminance only during the shutter closed period of the shutter glasses 200 is set to an appropriate time. In the example shown in FIG. 10, in the first half of the shutter open period of the shutter glasses 200 in which low luminance display is performed, display is performed at a luminance lower than the desired luminance. In the second half of the shutter open period, the luminance is gradually increased. By controlling the luminance in this manner, the average luminance can be caused to coincide with or approach the desired luminance during the shutter open period in which low luminance display is performed.

Figure 11:
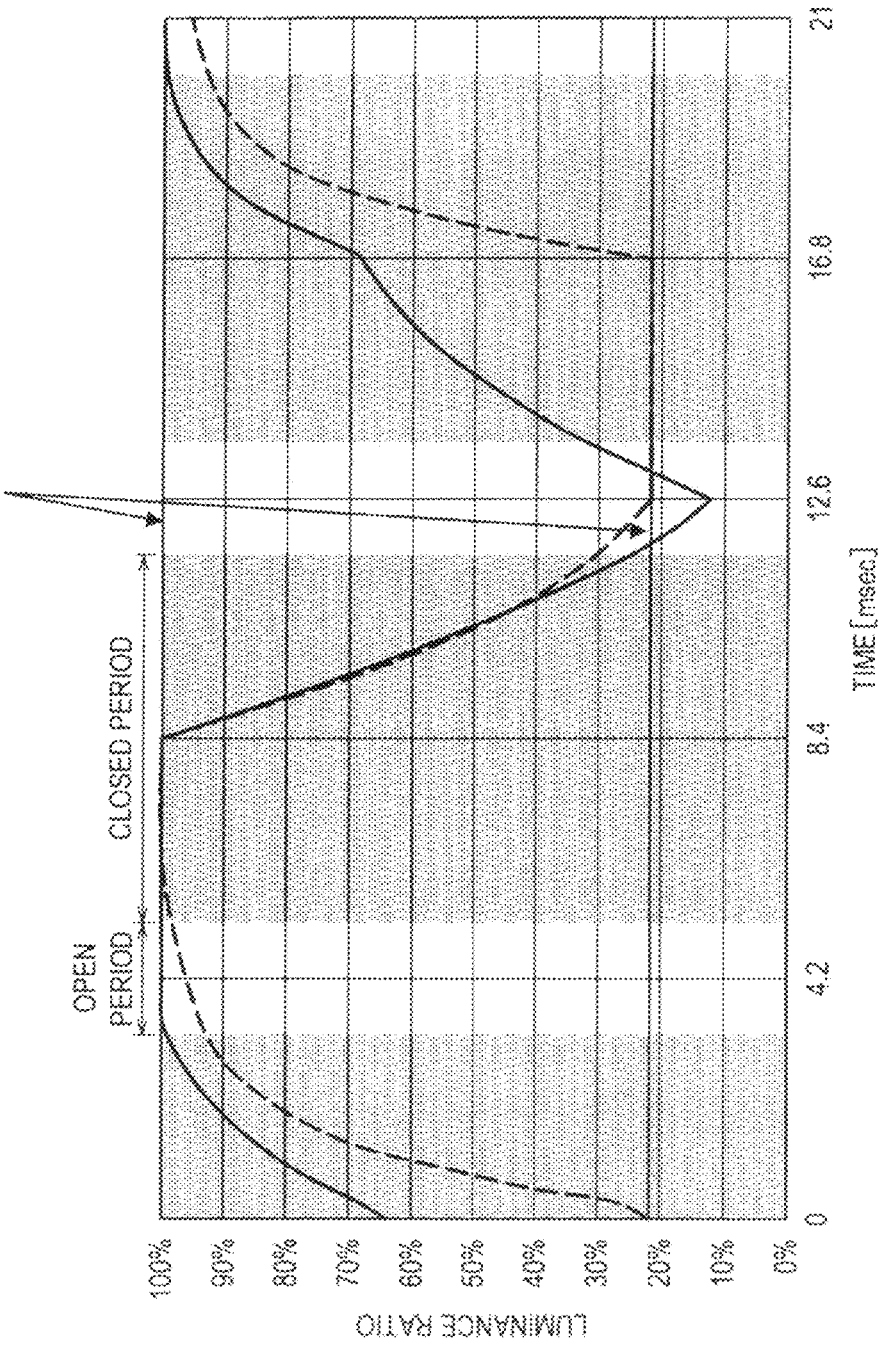
FIG. 11 is an explanatory diagram showing, in the form of a graph, an improvement example of high gradation in the lower section of the screen.

FIG. 11 is an explanatory diagram showing, in the form of a graph, an improvement example of high gradation in the lower section of the screen of the display panel 112, when the overdrive processing by the drive compensation execution portion 166 is performed. In FIG. 11, similar to FIG. 8 or the like, the waveform shown by the dotted line indicates a change in luminance ratio when the known overdrive processing that optimizes the central section of the screen is performed. On the other hand, the waveform shown by the solid line indicates a change in luminance ratio when the overdrive processing by the drive compensation execution portion 166 is performed. Note that, in the example shown in FIG. 11, the shutter open period and the shutter closed period exist at the same timings as in the example shown in FIG. 9. Although the shutter open periods are different in FIG. 10 and FIG. 11, this is for ease of explanation. The shutter open periods in the upper section and the lower section of the screen of the display panel 112 are the same.

As shown by the dotted line waveform in FIG. 11, when the known overdrive processing that optimizes the central section of the screen is performed, the desired luminance is at last reached when the shutter open period of the shutter glasses 200 ends. Therefore, when the overdrive processing is not performed, display with a desired luminance is not performed for all the shutter open period of the shutter glasses 200.

The desired luminance can be approached by performing the overdrive processing by the drive compensation execution portion 166. However, similar to the case shown in FIG. 10, when high gradation display is performed, it may not be possible to increase the luminance during the shutter open period of the shutter glasses 200. Therefore, in the present embodiment, similar to the improvement example of high gradation in the upper section of the screen of the display panel 112 shown in FIG. 10, the luminance is improved during the shutter closed period of the shutter glasses 200. More specifically, overdrive processing that increases a voltage value of the previous frame is performed. By performing the overdrive processing that improves the luminance during the shutter closed period of the shutter glasses 200, it is possible to suppress a decrease in luminance during the shutter open period of the shutter glasses 200, and it is also possible to cause the average luminance to approach the desired luminance for all the shutter open period of the shutter glasses 200.

However, similar to the case shown in FIG. 10, when only the overdrive processing that improves the luminance only during the shutter closed period of the shutter glasses 200 is executed, display is performed at a luminance deviating from the desired luminance during the shutter open period of the shutter glasses 200 in which low luminance display is performed. Therefore, during the shutter open period in which low luminance display is performed, in order to perform display such that the average luminance coincides with or approaches the desired luminance, it is desirable that the execution time of the overdrive processing that improves the luminance only during the shutter closed period of the shutter glasses 200 is set to an appropriate time.

Figure 12:
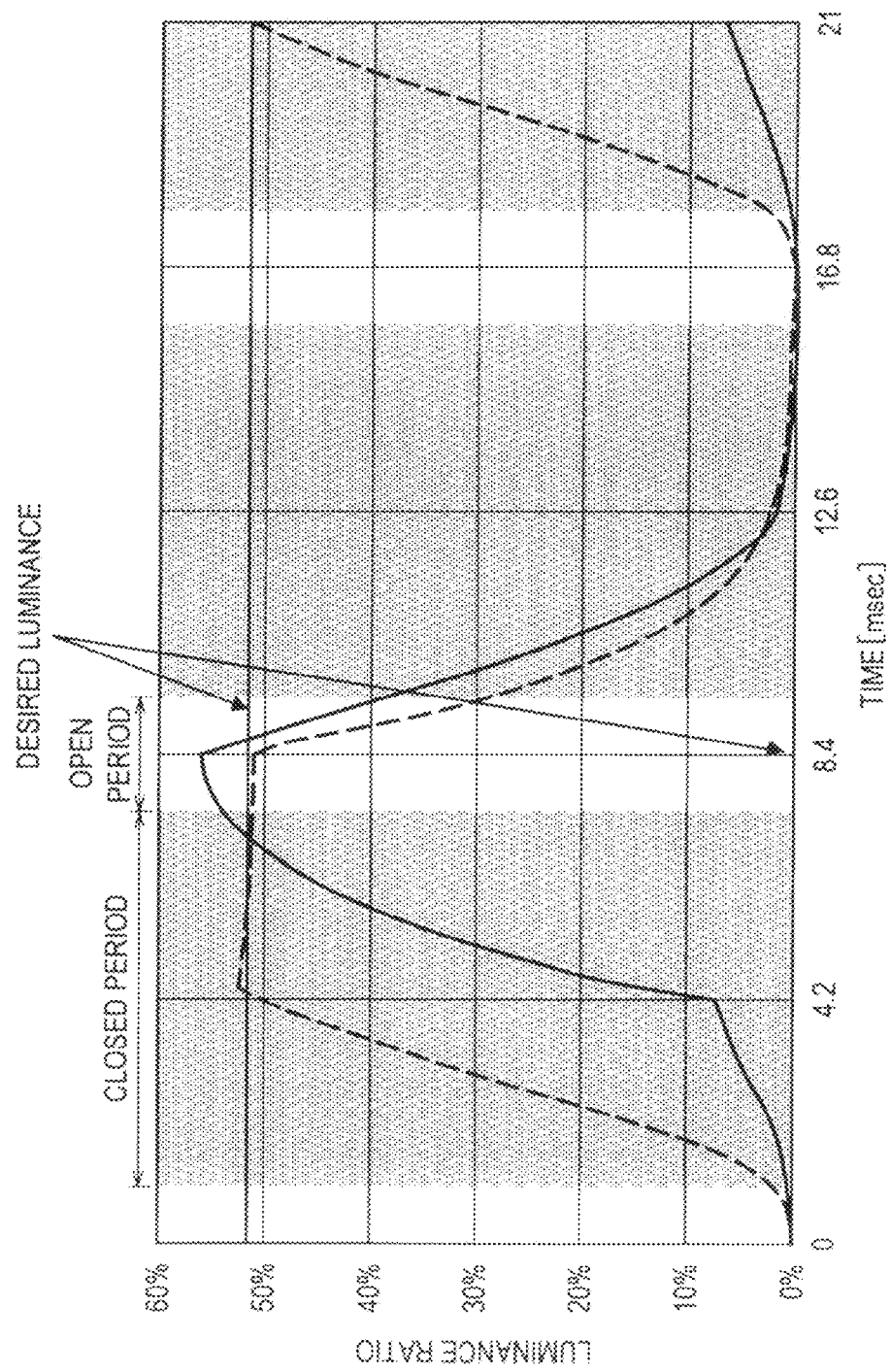
FIG. 12 is an explanatory diagram showing, in the form of a graph, an improvement example of low gradation in the upper section of the screen.

FIG. 12 is an explanatory diagram showing, in the form of a graph, an improvement example of low gradation in the upper section of the screen of the display panel 112, when the overdrive processing by the drive compensation execution portion 166 is performed. In FIG. 12, similar to FIG. 8 or the like, the waveform shown by the dotted line indicates a change in luminance ratio when the known overdrive processing that optimizes the central section of the screen is performed. On the other hand, the waveform shown by the solid line indicates a change in luminance ratio when the overdrive processing by the drive compensation execution portion 166 is performed. Note that, in the example shown in FIG. 12, the shutter open period and the shutter closed period exist at the same timings as in the example shown in FIG. 8.

As shown by the dotted line waveform in FIG. 12, when the known overdrive processing that optimizes the central section of the screen is performed, the luminance starts to increase or decrease from the desired luminance when half of the shutter open period of the shutter glasses 200 has elapsed. Therefore, when the overdrive processing is not performed, display with a desired luminance is not performed for all the shutter open period of the shutter glasses 200.

Accordingly, the luminance is decreased during the shutter closed period of the shutter glasses 200. More specifically, by performing overdrive processing that reduces a voltage value of the next frame, the average luminance can be caused to coincide with or approach the desired luminance during the shutter open period of the shutter glasses 200 in which display is performed on the high luminance side and the low luminance side.

Figure 13:
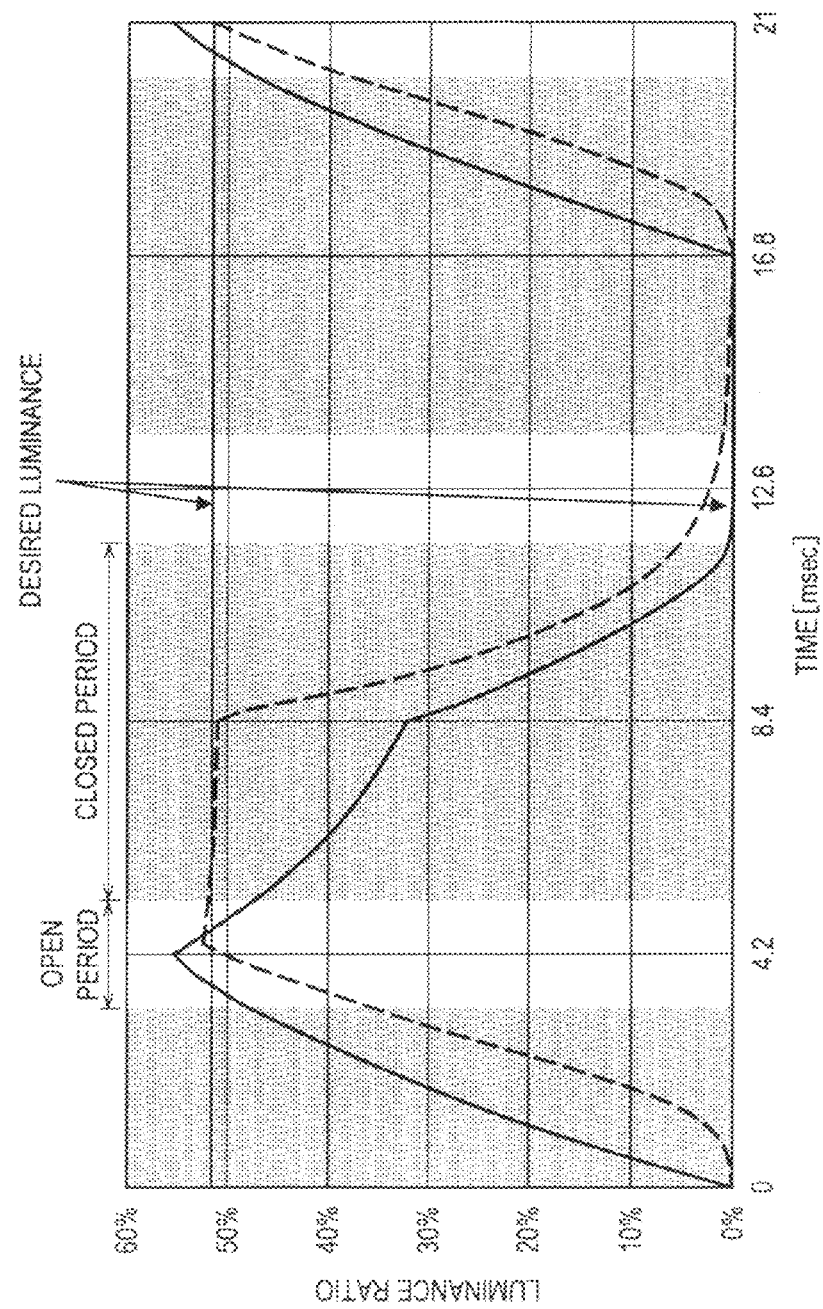
FIG. 13 is an explanatory diagram showing, in the form of a graph, an improvement example of low gradation in the lower section of the screen.

FIG. 13 is an explanatory diagram showing, in the form of a graph, an improvement example of low gradation in the lower section of the screen of the display panel 112, when the overdrive processing by the drive compensation execution portion 166 is performed. In FIG. 13, similar to FIG. 8 or the like, the waveform shown by the dotted line indicates a change in luminance ratio when the known overdrive processing that optimizes the central section of the screen is performed. On the other hand, the waveform shown by the solid line indicates a change in luminance ratio when the overdrive processing by the drive compensation execution portion 166 is performed. In the example shown in FIG. 13, the shutter open period and the shutter closed period exist at the same timings as in the example shown in FIG. 9. Although the shutter open periods are different in FIG. 12 and FIG. 13, this is for ease of explanation. The shutter open periods in the upper section and the lower section of the screen of the display panel 112 are the same.

As shown by the dotted line waveform in FIG. 13, when the known overdrive processing that optimizes the central section of the screen is performed, the desired luminance is reached when half of the shutter open period of the shutter glasses 200 has elapsed, or the desired luminance is at last reached when the shutter open period ends. Therefore, when the overdrive processing is not performed, display with a desired luminance is not performed for all the shutter open period of the shutter glasses 200.

Accordingly, the luminance is increased during the shutter closed period of the shutter glasses 200. More specifically, by performing overdrive processing that reduces a voltage value of the previous frame, the average luminance can be caused to coincide with or approach the desired luminance, during the shutter open period of the shutter glasses 200 in which display is performed on the high luminance side and the low luminance side.

Note that drive compensation during the shutter open period of the shutter glasses 200 may be applied to cases other than the case where the image for the right eye and the image for the left eye are displayed two or more times continuously as shown in FIG. 5. More specifically, the drive compensation during the shutter open period of the shutter glasses 200 may also be performed in a case where the image for the right eye and the image for the left eye are alternately displayed once each.

1-6. Modified Examples of Drive Compensation Method

Figure 14:
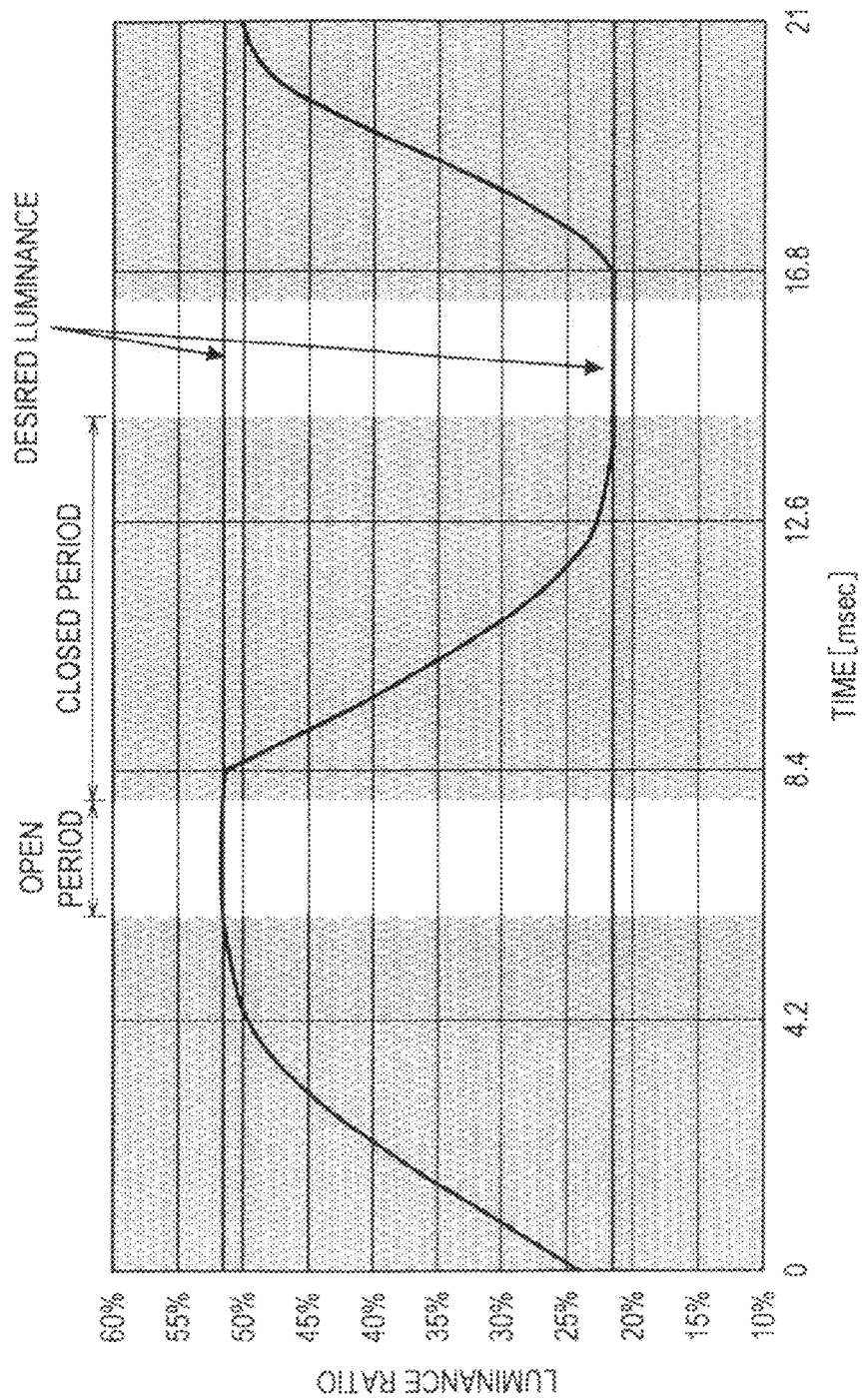
FIG. 14 is an explanatory diagram showing, in the form of a graph, an example of change in luminance in a central section of the screen, when an image for the right eye and an image for the left eye are alternately displayed, once each.

FIG. 14 is an explanatory diagram showing, in the form of a graph, an example of change in luminance in the central section of the screen, when an image for the right eye and an image for the left eye are alternately displayed once each. As shown in FIG. 14, in the central section of the screen, display with a desired luminance is performed for all the shutter open period of the shutter glasses 200. However, even when the image for the right eye and the image for the left eye are alternately displayed once each if drive compensation is not performed at all, display with a desired luminance is not performed for all the shutter open period of the shutter glasses 200 in the upper section and the lower section of the screen.

Figure 15:
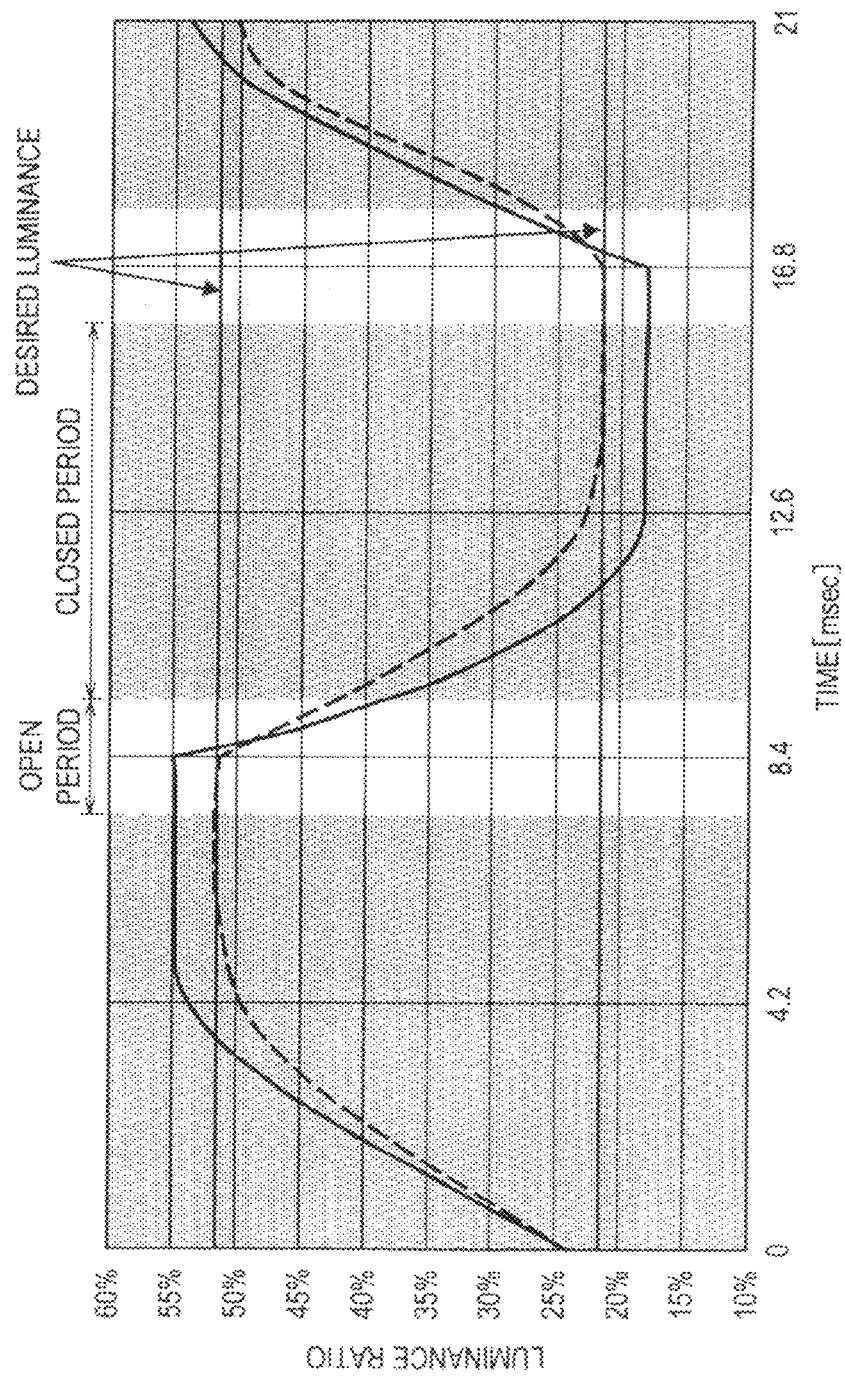
FIG. 15 is an explanatory diagram showing, in the form of a graph, an improvement example in the upper section of the screen.

FIG. 15 is an explanatory diagram showing, in the form of a graph, an improvement example in the upper section of the screen of the display panel 112, when the overdrive processing by the drive compensation execution portion 166 is performed in a case where an image for the right eye and an image for the left eye are alternately displayed once each. In FIG. 15, similar to FIG. 8 or the like, the waveform shown by the dotted line indicates a change in luminance ratio when the known overdrive processing that optimizes the central section of the screen is performed. On the other hand, the waveform shown by the solid line indicates a change in luminance ratio when the overdrive processing by the drive compensation execution portion 166 is performed. Note that, in the example shown in FIG. 15, the shutter open period and the shutter closed period exist at the same timings as in the example shown in FIG. 8.

As shown by the dotted line waveform in FIG. 15, when the known overdrive processing that optimizes the central section of the screen is performed, the luminance starts to decrease or increase from the desired luminance when half of the shutter open period of the shutter glasses 200 has elapsed. Therefore, when the overdrive processing is not performed, display with a desired luminance is not performed for all the shutter open period of the shutter glasses 200.

Accordingly, by performing overdrive processing that increases or reduces the luminance during the shutter closed period of the shutter glasses 200, the average luminance can be caused to coincide with or approach the desired luminance, during the shutter open period of the shutter glasses 200 in which display is performed on the high luminance side and the low luminance side.

Figure 16:
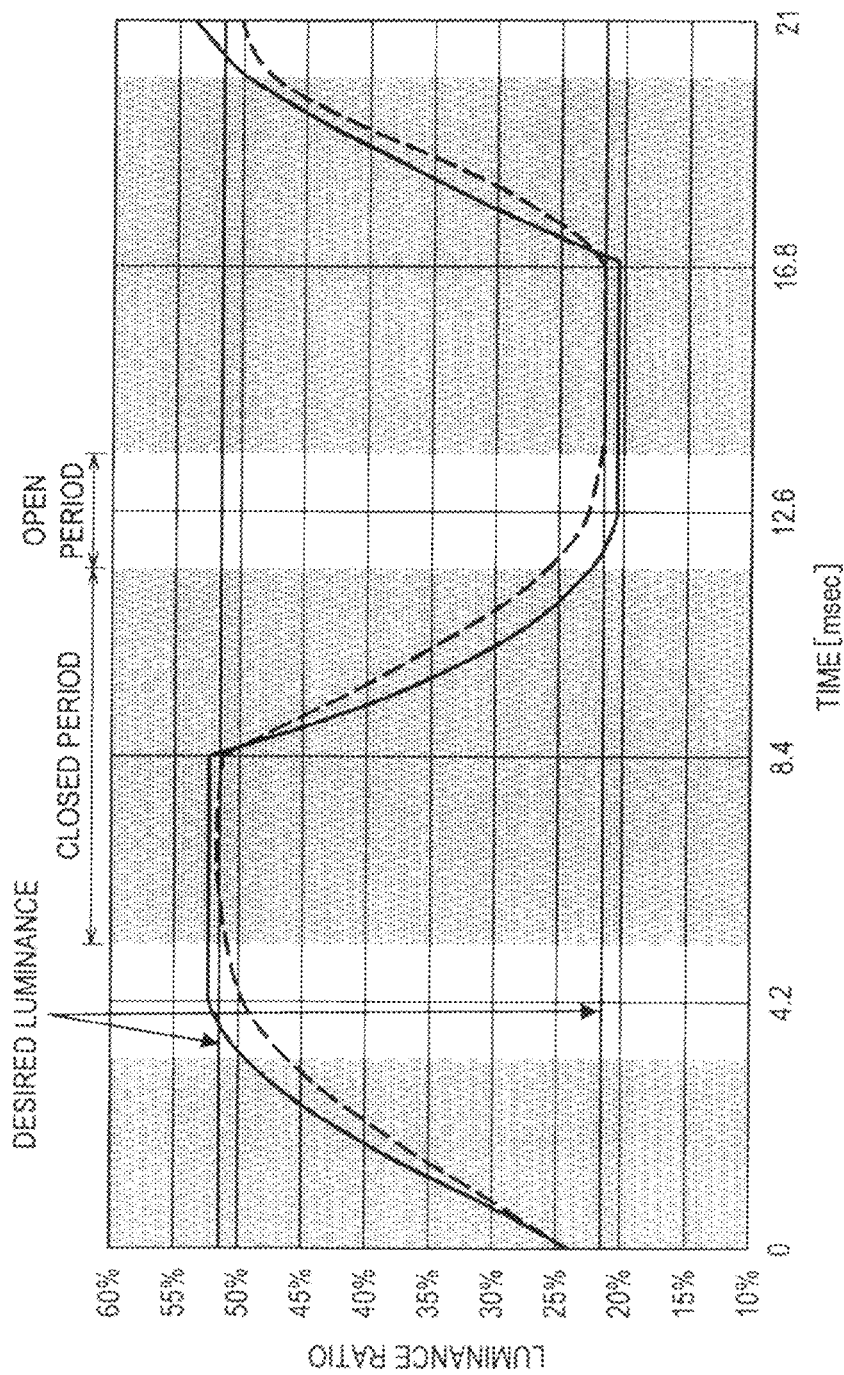
FIG. 16 is an explanatory diagram showing, in the form of a graph, an improvement example in the lower section of the screen.

FIG. 16 is an explanatory diagram showing, in the form of a graph, an improvement example in the lower section of the screen of the display panel 112, when the overdrive processing by the drive compensation execution portion 166 is performed in a case where an image for the right eye and an image for the left eye are alternately displayed once each. In FIG. 16, similar to FIG. 8 or the like, the waveform shown by the dotted line indicates a change in luminance ratio when the known overdrive processing that optimizes the central section of the screen is performed. On the other hand, the waveform shown by the solid line indicates a change in luminance ratio when the overdrive processing by the drive compensation execution portion 166 is performed. Note that, in the example shown in FIG. 16, the shutter open period and the shutter closed period exist at the same timings as in the example shown in FIG. 9. Although the shutter open periods are different in FIG. 15 and FIG. 16, this is for ease of explanation. The shutter open periods in the upper section and the lower section of the screen of the display panel 112 are the same.

As shown by the dotted line waveform in FIG. 16, when the known overdrive processing that optimizes the central section of the screen is performed, the desired luminance is at last reached when the shutter open period of the shutter glasses 200 has elapsed. Therefore, when the overdrive processing is not performed, display with a desired luminance is not performed for all the shutter open period of the shutter glasses 200.

Accordingly, by performing the overdrive processing that increases or reduces the luminance during the shutter closed period of the shutter glasses 200, the average luminance can be caused to coincide with or approach the desired luminance, during the shutter open period of the shutter glasses 200 in which display is performed on the high luminance side and the low luminance side.

Hereinabove, improvements in crosstalk as a result of performing the overdrive processing by the drive compensation execution portion 166 are explained with reference to FIG. 8 to FIG. 16.

2. Conclusion

As described above, according to the present invention, the drive compensation execution portion 166 performs drive compensation during the shutter open period of the shutter glasses 200 such that the average value of the luminance of an image displayed on the display panel 112 is caused to coincide with or approach a desired luminance. The drive compensation performed by the drive compensation execution portion 166 is over drive processing that increases or decreases the luminance during the shutter open period or the shutter closed period of the shutter glasses 200, for example. When the drive compensation is performed by the drive compensation execution portion 166, the average value of the luminance of the displayed image during the shutter open period of the shutter glasses 200 can be caused to coincide with or approach the desired luminance in all the regions of the display panel 112.

Note that, drive compensation processing in the above-described timing control portion 140 may be performed by hardware or software. When the drive compensation processing is performed by software, a storage medium that stores a program, for example, may be incorporated in the display device 100. Further, the program may be read and executed sequentially by a central processing unit (CPU), a digital signal processor (DSP) or another control device incorporated in the display device 100.

It should be understood by those skilled in the art that various modifications, combinations, sub-combinations and alterations may occur depending on design requirements and other factors insofar as they are within the scope of the appended claims or the equivalents thereof.

For example, in the above-described embodiment, the overdrive processing is performed after a pulse signal is generated. However, the present invention is not limited to this example. The pulse signal may be generated after the overdrive processing is performed, and the generated pulse signal may be supplied to the display panel.

What is claimed is:

1. A display device, comprising:
 a display portion that line-sequentially displays, in an image display region, a first image based on a first image signal and a second image based on a second image signal by successively switching, in sequence, one and another of the first image and one and another of the second image, in which the switching occurs each time that a predetermined interval elapses; and
 a drive compensation portion that performs predetermined drive compensation that compensates pixel drive on the display portion at a time of the display of a respective one of the first image or the second image that is based on the first image signal or the second image signal input to the display portion, in accordance with a position of the image display region and a luminance of the respective one of the first image or the second image that is based on the first image signal or the second image signal, such that an average luminance of the respective one of the first image or the second image that is based on the first image signal or the second image signal becomes substantially uniform across the image display region during a predetermined period of the predetermined interval that is shorter than the predetermined interval, in which a shutter is open for the predetermined period and the predetermined drive compensation is performed without changing the predetermined period and in a period other than the predetermined period.

2. The display device according to claim 1, wherein the drive compensation portion includes a drive compensation parameter storage portion that stores parameters used in the predetermined drive compensation, and a drive compensation execution portion that performs drive compensation that compensates the pixel drive on the display portion at the time of the display on the respective one of the first image or the second image that is based on the first image signal or the second image signal in accordance with the parameters stored in the drive compensation parameter storage portion.

3. The display device according to claim 1, wherein when the luminance of the first image and the luminance of the second image are extremely high or low, the drive compensation portion performs the predetermined drive compensation in the period other than the predetermined period.

4. The display device according to claim 2, wherein the parameters stored in the drive compensation parameter storage portion have values that are different from each other with respect to a writing direction of the first image signal and the second image signal to the image display region.

5. The display device according to claim 2, wherein the drive compensation parameter storage portion has parameters that are different from each other in accordance with a plurality of regions in the image display region.

6. The display device according to claim 2, wherein the drive compensation execution portion performs drive compensation using parameters that continuously vary in accordance with the position of the image display region.

7. The display device according to claim 6, wherein the drive compensation execution portion generates the parameters that continuously vary in accordance with the position of the image display region, by interpolating parameters that are given in accordance with the position of the image display region.

8. The display device according to claim 1, wherein the display portion is a liquid crystal panel.

9. The display device according to claim 1, wherein the predetermined period is a period during which light from the display portion is allowed to enter the eyes of a viewer.

10. The display device according to claim 1, wherein the drive compensation portion performs predetermined drive compensation that compensates pixel drive on the display portion at a time of the display of a respective another of the first image or the second image that is based the first image signal or the second image signal input to the display portion, in accordance with the position of the image display region and a luminance of the respective another of the first image or the second image that is based on the first image signal or the second image signal, such that an average luminance of the respective another of the first image or the second image that is based on the first image signal or the second image signal becomes substantially uniform across the image display region during all of another predetermined period that is shorter than the predetermined interval, the shutter being open for the another predetermined period, followed by a part of a next period in which the shutter is closed, by increasing or decreasing the luminance of the respective another one of the first image or the second image during the another predetermined period by performing the predetermined drive compensation at the time of the display of the respective another of the first image or the second image without changing the another predetermined period and in a period other than the another predetermined period.

11. A display method, comprising:
acquiring a first image signal and a second image signal that are input to a display portion that displays a first image based on the first image signal and a second image based on the second image signal on an image display region by successively switching, in sequence, one and another of the first image and one and another of the second image, in which the switching occurs each time that a predetermined interval elapses;
acquiring a position of the image display region, a luminance of the first image and a luminance of the second image;
performing predetermined drive compensation that compensates pixel drive on the display portion at a time of the display of a respective one of the first image or the second image that is based on the first image signal or the second image signal acquired in the signal acquiring step, in accordance with the position of the image display region and the luminance of the respective one of the first image or the second image that is based on the first image signal or the second image signal that are acquired in the acquiring step, such that an average luminance of the respective one of the first image or the second image that is based on the first image signal or the second image signal becomes substantially uniform across the image display region during a predetermined period of the predetermined interval that is shorter than the predetermined interval, in which a shutter is open for the predetermined period and the predetermined drive compensation is performed without changing the predetermined period and in a period other than the predetermined period; and
displaying, in the image display region, the first image based on the first image signal and the second image based on the second image signal by successively switching, in sequence, the one and the another of the first image and the one and the another of the second image each time that the predetermined interval elapses, the respective one of first image or the second image that is based on the first image signal or the second image signal input having been subjected to the drive compensation in the drive compensating step.

12. The display device method to claim 11, wherein the drive compensating step further performs the predetermined drive compensation that compensates pixel drive on the display portion at a time of the display of a respective another of the first image or the second image that is based the first image signal or the second image signal input to the display portion, in accordance with the position of the image display region and a luminance of the respective another of the first image or the second image that is based on the first image signal or the second image signal, such that an average luminance of the respective another of the first image or the second image that is based on the first image signal or the second image signal becomes substantially uniform across the image display region during all of another predetermined period that is shorter than the predetermined interval, the shutter being open for the another predetermined period, followed by a part of a next period in which the shutter is closed, by increasing or decreasing the luminance of the respective another of the first image or the second image during the another predetermined period by performing the predetermined drive compensation at the time of the display of the respective another of the first image or the second image without changing the another predetermined period and in a period other than the another predetermined period, and the displaying step displays, in the image display region, the first image based on the first image signal and the second image based on the second image signal by successively switching, in sequence, the one and the another of the first image and the one and the another of the first image and the second image each time that the predetermined interval elapses, the respective one of first image signal or the second image signal and the respective another of the first image signal or the second image signal each having been subjected to the drive compensation in the drive compensating step.

\* \* \* \* \*